US007894828B2

(12) United States Patent
Dawson et al.

(10) Patent No.: US 7,894,828 B2
(45) Date of Patent: Feb. 22, 2011

(54) SYSTEM AND METHOD FOR ESTABLISHING PEER-TO-PEER BANDWIDTH SHARING AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US); Philip K. Mullins, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/755,808

(22) Filed: May 31, 2007

(65) Prior Publication Data

US 2008/0299988 A1    Dec. 4, 2008

(51) Int. Cl.
*H04W 24/00*    (2009.01)
(52) U.S. Cl. .................... 455/456.1; 340/338
(58) Field of Classification Search ......... 370/310–350; 455/456.1
See application file for complete search history.

(56) References Cited

U.S. PATENT DOCUMENTS

| 5,437,054 | A  | 7/1995  | Rappaport et al. |
| 5,490,201 | A  | 2/1996  | Moberg et al. |
| 6,006,084 | A  | 12/1999 | Miller et al. |
| 6,035,281 | A  | 3/2000  | Crosskey et al. |
| 6,047,268 | A  | 4/2000  | Bartoli et al. |
| 6,396,805 | B2 | 5/2002  | Romrell |
| 6,397,061 | B1 | 5/2002  | Jordan et al. |
| 6,522,735 | B1 | 2/2003  | Fortman et al. |
| 6,763,248 | B1 | 7/2004  | Odamura |
| 6,810,428 | B1 | 10/2004 | Larsen et al. |
| 6,941,378 | B2 | 9/2005  | Apostolopoulos et al. |
| 6,954,790 | B2 | 10/2005 | Forslöw |
| 6,961,575 | B2 | 11/2005 | Stanforth |
| 6,975,613 | B1 | 12/2005 | Johansson |
| 6,980,511 | B1 | 12/2005 | Li |
| 7,016,375 | B1 | 3/2006  | Rosenberg et al. |

(Continued)

FOREIGN PATENT DOCUMENTS

EP    0999662    5/2005

(Continued)

OTHER PUBLICATIONS

Non-final Office Action dated Dec. 23, 2008 in U.S. Appl. No. 11/755,806.

(Continued)

*Primary Examiner*—Kent Chang
*Assistant Examiner*—Kashif Siddiqui
(74) *Attorney, Agent, or Firm*—William Schiesser; Roberts Mlotkowski Safran & Cole, P.C.

(57) ABSTRACT

Systems and methods for establishing peer-to-peer bandwidth sharing ad hoc networks. A method includes: determining a first location and a second location of data; instructing a first device to download a first portion of the data from the first location; instructing a second device to download a second portion of the data from the second location; and receiving the first portion of the data from the first device and the second portion of the data from the second device.

32 Claims, 14 Drawing Sheets

U.S. PATENT DOCUMENTS

| | | | |
|---|---|---|---|
| 7,028,096 B1 | 4/2006 | Lee | |
| 7,075,890 B2 | 7/2006 | Ozer et al. | |
| 7,130,283 B2 | 10/2006 | Vogel et al. | |
| 7,240,015 B1 | 7/2007 | Karmouch et al. | |
| 7,340,759 B1 | 3/2008 | Rodriguez | |
| 7,447,656 B2 | 11/2008 | Parthasarathy | |
| 7,450,517 B2* | 11/2008 | Cho | 370/238 |
| 2001/0029182 A1 | 10/2001 | McCann et al. | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0069278 A1 | 6/2002 | Forslöw | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1* | 9/2002 | Kulikov et al. | 370/349 |
| 2002/0141358 A1 | 10/2002 | Requena | |
| 2002/0145978 A1 | 10/2002 | Batsell et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0153338 A1 | 8/2003 | Herz et al. | |
| 2003/0235174 A1* | 12/2003 | Pichna et al. | 370/338 |
| 2004/0006621 A1 | 1/2004 | Bellinson et al. | |
| 2004/0029553 A1 | 2/2004 | Cain | |
| 2004/0064351 A1 | 4/2004 | Mikurak | |
| 2004/0128231 A1 | 7/2004 | Morita | |
| 2004/0156312 A1 | 8/2004 | Salonidis et al. | |
| 2004/0162871 A1 | 8/2004 | Pabla et al. | |
| 2004/0165548 A1* | 8/2004 | Backes | 370/328 |
| 2004/0185777 A1 | 9/2004 | Bryson | |
| 2004/0192204 A1 | 9/2004 | Periyalwar et al. | |
| 2004/0260808 A1 | 12/2004 | Strutt | |
| 2004/0264466 A1 | 12/2004 | Huang | |
| 2005/0080872 A1* | 4/2005 | Davis et al. | 709/217 |
| 2005/0153725 A1 | 7/2005 | Naghian et al. | |
| 2005/0157661 A1* | 7/2005 | Cho | 370/254 |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0085543 A1 | 4/2006 | Hrastar et al. | |
| 2006/0095582 A1 | 5/2006 | Nitya et al. | |
| 2006/0114853 A1* | 6/2006 | Hasty et al. | 370/329 |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0224502 A1 | 10/2006 | McGowan | |
| 2007/0005797 A1 | 1/2007 | Fontijn et al. | |
| 2007/0117537 A1 | 5/2007 | Hui et al. | |
| 2008/0008140 A1 | 1/2008 | Forssell | |
| 2008/0040481 A1 | 2/2008 | Joshi et al. | |
| 2008/0167982 A1 | 7/2008 | Leo et al. | |

FOREIGN PATENT DOCUMENTS

| | | |
|---|---|---|
| WO | 9915960 | 4/1999 |
| WO | 03037009 | 5/2003 |
| WO | 20040015858 | 12/2003 |
| WO | 2006004628 | 1/2006 |

OTHER PUBLICATIONS

Final Office Action dated Jun. 3, 2009 in U.S. Appl. No. 11/755,806.
Final Office Action dated Jun. 9, 2009 in U.S. Appl. No. 11/755,806.
D. Zhu et al., "QoS Aware Wireless Bandwidth Aggregation (QAWBA) by Integrating Cellular and Ad-hoc Networks."
D. Zhu et al., "Using Cooperative Multiple Paths to Reduce File Download Latency in Cellular Data Networks."
Non-final Office Action dated Oct. 19, 2009 in U.S. Appl. No. 11/755,788.
Qui et al.. "Bandwidth in Ad Hoc Networks: A Price-Based Approach," 2003, IEEE, pp. 1-10.
Non-final Office Action dated Dec. 24, 2009 in U.S. Appl. No. 11/755,776.
Non-final Office Action dated Jan. 22, 2010 in U.S. Appl. No. 11/755,778.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
Office Action dated Jun. 4, 2010 in U.S. Appl. No. 11/755,780.
Office Action dated Jun. 22, 2010 in U.S. Appl. No. 11/755,776.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Notice of Allowance dated Aug. 25, 2010 in U.S. Appl. No. 11/755,780.
Office Action dated Sep. 14, 2010 in U.S. Appl. No. 11/755,788.
Final Office Action dated Sep. 15, 2010 in U.S. Appl. No. 11/755,782.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.

* cited by examiner

| Node Name | Node Type | Location | File Requested for Transfer | Price | Service Level Objective | Current Quality of Service |
|---|---|---|---|---|---|---|
| | | | | | | |
| | | | | | | |

FIG. 4

SYSTEM AND METHOD FOR ESTABLISHING PEER-TO-PEER BANDWIDTH SHARING AD HOC NETWORKS

CROSS-REFERENCE TO RELATED APPLICATIONS

This application is related to the following copending applications, all of which are incorporated herein by reference in their entireties: Copending application Ser. No. 11/755,780, published as U.S. Pub. No. 2008/0298327; copending application Ser. No. 11/755,775, published as U.S. Pub. No. 2008/0301017; and copending application Ser. No. 11/755,802, published as U.S. Pub. No. 2008/0300932.

FIELD OF THE INVENTION

The invention generally relates to systems and methods for data transfer and, more particularly, to systems and methods for data transfer in peer-to-peer bandwidth sharing ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises determining a first location and a second location of data; instructing a first device to download a first portion of the data from the first location; instructing a second device to download a second portion of the data from the second location; and receiving the first portion of the data from the first device and the second portion of the data from the second device.

In another aspect of the invention, a method comprises determining a first target location and a second target location; locating potential lenders; querying potential lenders for availability of sharing bandwidth; transmitting a first portion of data and instruction to upload the first portion of data to the first target location to a first lender; and transmitting a second portion of data and instruction to upload the second portion of data to the second target location to a second lender.

In another aspect of the invention, a method comprises determining actual or target remote locations of data; establishing an ad hoc network through direct wireless connections to local devices; and receiving data from the actual remote locations or transmitting data to the target remote locations via the devices.

In another aspect of the invention, there is a computer program product comprising a computer usable medium having a computer readable program embodied in the medium. The computer readable program when executed on a computing device causes the computing device to determine actual or target remote locations of data; establish an ad hoc network amongst local devices; and receive data from the actual remote locations or transmit data to the target remote locations via the devices.

In another aspect of the invention, there is a system comprising a computer infrastructure operable to: determine actual or target remote locations of data; establish an ad hoc network amongst local devices; and receive data from the actual remote locations or transmit data to the target remote locations via the devices.

BRIEF DESCRIPTION OF THE DRAWINGS

FIG. 4 shows an example table created and used in implementing aspects of the invention.

DETAILED DESCRIPTION OF EMBODIMENTS OF THE INVENTION

The invention generally relates to systems and methods for data transfer and, more particularly, to systems and methods for data transfer in peer-to-peer bandwidth sharing ad hoc networks. The invention allows a device with a relatively low bandwidth (e.g., low rate of data transfer) to leverage the bandwidth of other local devices to create a virtual high bandwidth (e.g., high rate of data transfer) connection. In exemplary implementations of the invention, an ad hoc network of wireless devices is established for transferring data from remote locations to a member of the network via other members of the network. Alternatively, data may be transferred from a single member of the network to a remote location via the other members of the network. In this manner, data may be transferred (e.g., downloaded, uploaded, etc.) in a parallel fashion, instead of serial fashion, thereby improving the speed and efficiency of data transfer.

Figure 1:
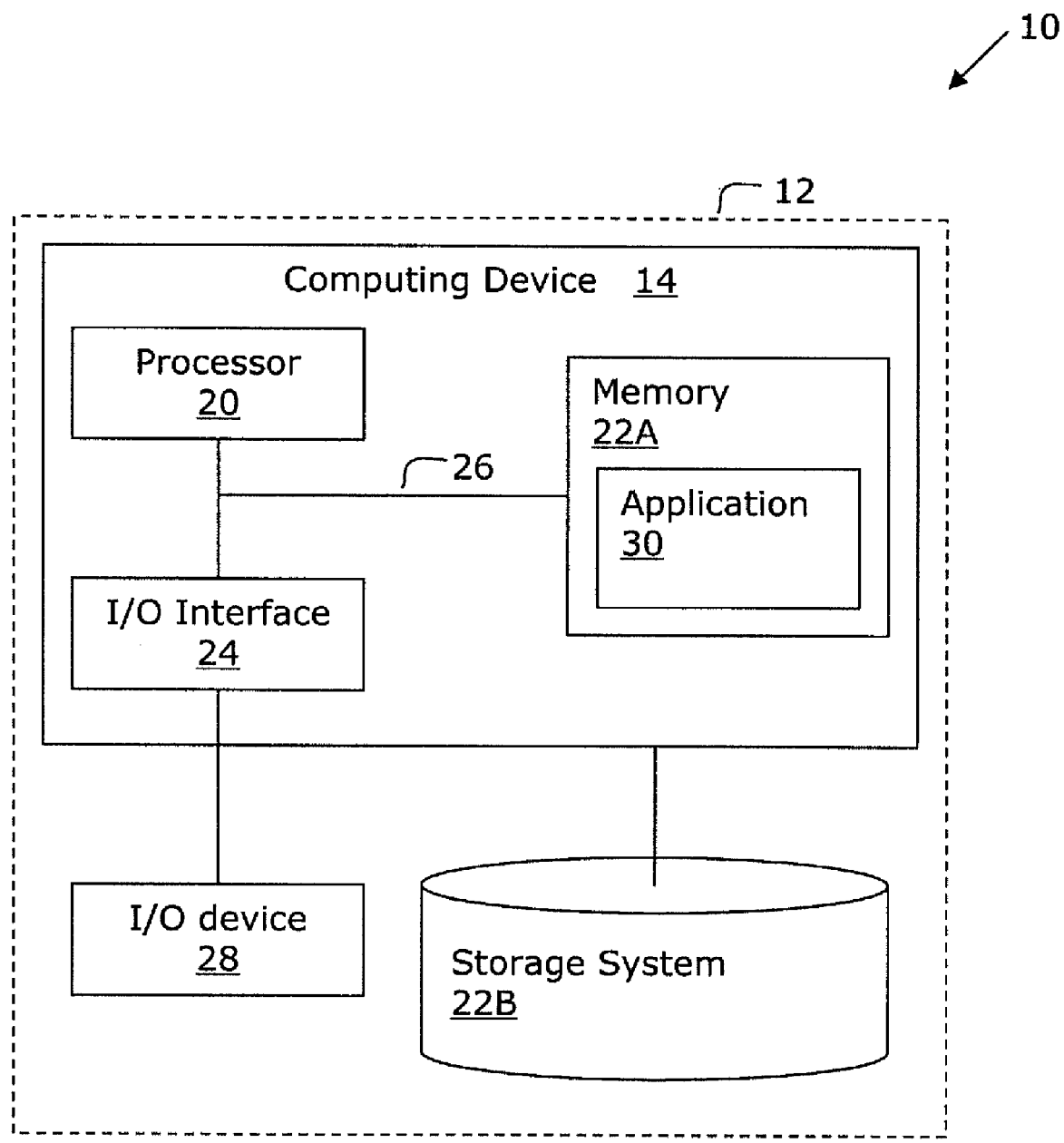
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, e.g., establish ad hoc networks, transfer data over ad hoc networks, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent-type services, a file may be stored in more than one location to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is an IEEE 802.11g local area connection that creates a high-speed wireless connection between two cellular phone devices within close range, and wherein the cellular phones' cellular (e.g., wireless telephony) connection to remote locations provides bandwidth at less than $\frac{1}{100}^{th}$ of the local IEEE 802.11 g connection.

The present invention is directed to systems and methods for transferring data using ad hoc networks in which a single member of the network borrows bandwidth from other members of the network. The present invention provides peer-to-peer implementations of downloading data from, or uploading data to, a remote location or locations. Illustrative cases of data transfer to/from a remote location using gateway implementations are set forth in co-pending application Ser. No. 11/755,780.

Figure 2A:
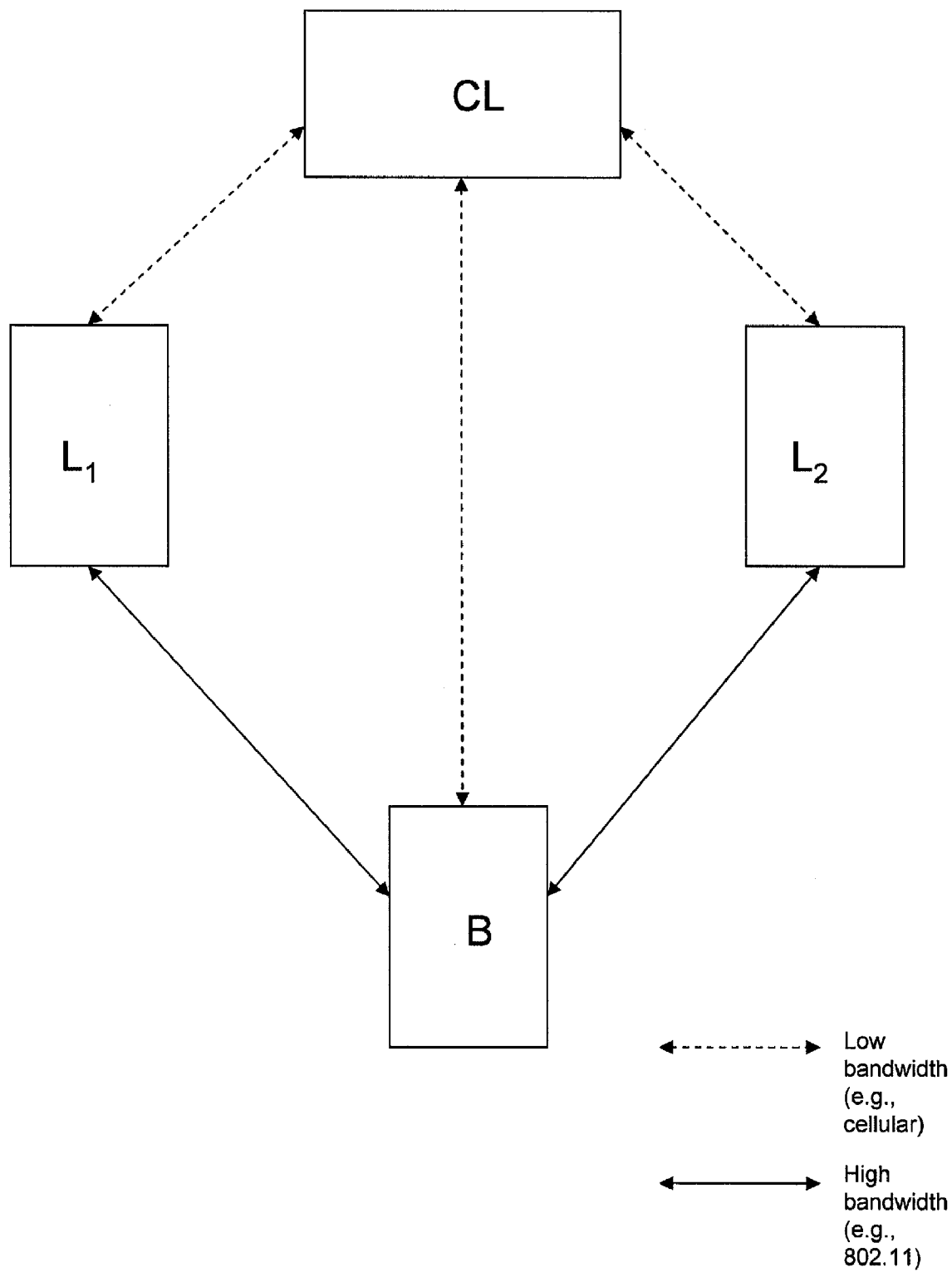
FIGS. 2A through 2D show peer-to-peer bandwidth-sharing ad hoc networks according to aspects of the invention.

FIGS. 2A through 2D show a general overview of a non-gateway, peer-to-peer (P2P) bandwidth sharing architecture. In these implementations, as shown in FIG. 2A, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess (e.g., currently unused) bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
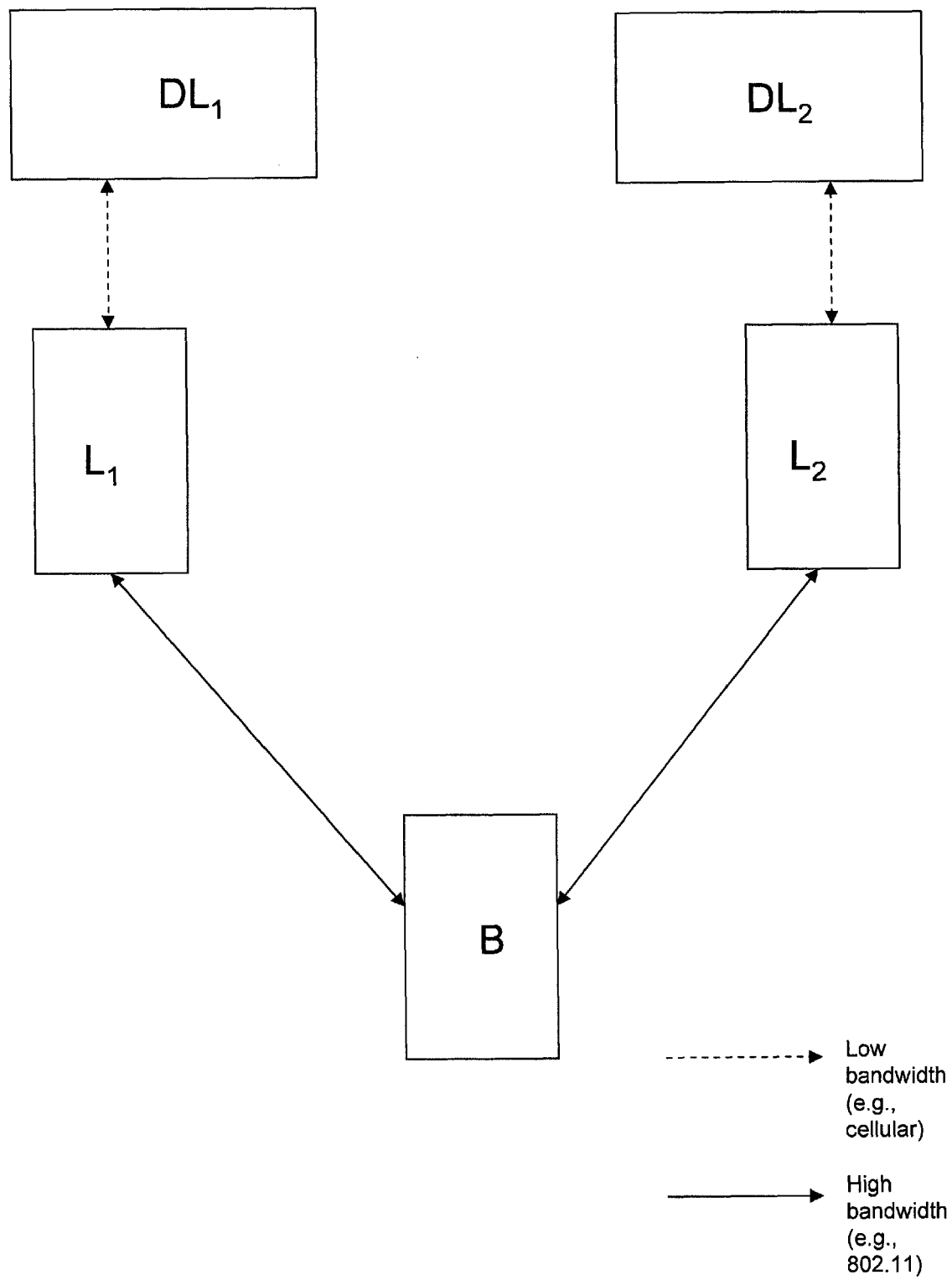

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 2C:
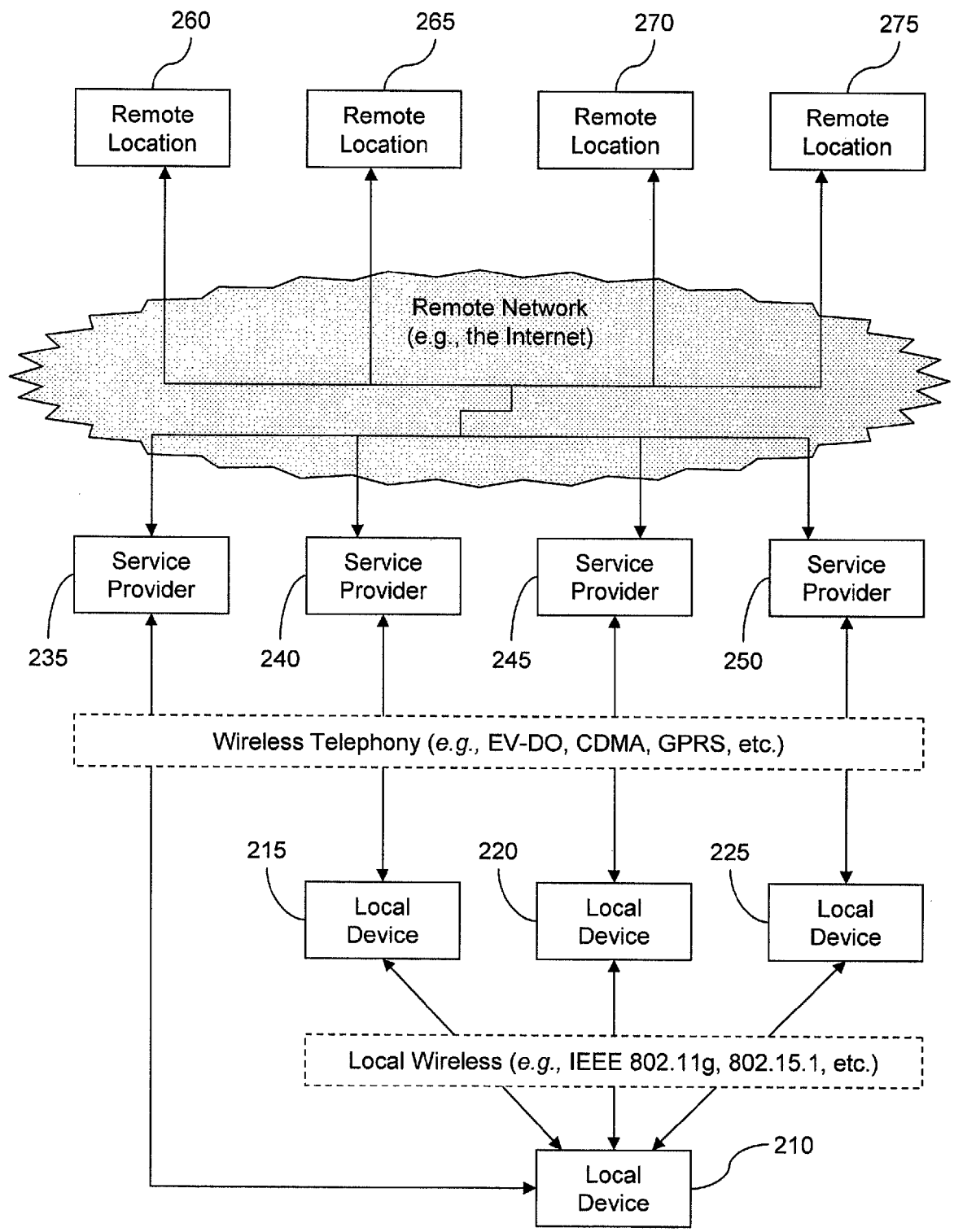

FIG. 2C is a more detailed overview of a non-gateway, peer-to-peer (P2P) bandwidth sharing architecture. In this implementation, a first node 210, second node 215, third node 220, and fourth node 225 each constitutes a respective wireless computing device such as, for example, a notebook computer, smart phone, personal digital assistant (PDA), etc. Each node 210, 215, 220, 225 has the ability to communicate (e.g., transfer data via known wireless protocols) with devices local to itself, as well as the ability to communicate with remote locations (e.g., the Internet) via an Internet Service Provider (ISP). Although four nodes are shown, any number of nodes can be used.

For example, the first node 210 may communicate with the second node 215 via any appropriate protocol, such as, for example, local wireless protocols IEEE 802.11a, 802.11b, 802.11 g, IEEE 802.15.1 (i.e., Bluetooth®), IEEE 802.15.4 (e.g., Zigbee®), etc. Similarly, the first node 210 may communicate with each of the third and fourth nodes 220, 225, respectively, using any such protocol. In this manner, the first node 210 may transfer data (e.g., text file, word-processing document, spreadsheet, image file, multimedia file, etc.) to and/or from any one of the second, third, and fourth nodes 215, 220, 225.

The first node 210 may additionally communicate with a first ISP 235 via any appropriate wireless telephony (e.g., cellular) protocol, such as, for example, EV-DO, CDMA, EDGE, GPRS, etc. Similarly, second node 215 may communicate with a second ISP 240, third node 220 may communicate with a third ISP 245, and fourth node 225 may communicate with a fourth ISP 250 via any such wireless telephony protocol. The ISPs, in turn, provide connection to a remote network, such as the Internet. For example, the ISPs may provide connection to any number and type of remote locations 260, 265, 270, 275 on the Internet. Each remote location 260, 265, 270, 275 may comprise, for example, a computing device that is capable of storing data and transferring data to/from the various ISPs 235, 240, 245, 250, such as, for example, a desktop computer, server, etc., as shown in FIG. 1. In this manner, each node 210, 215, 220, and 225 may download and upload data from/to the Internet via their respective ISPs 235, 240, 245, 250. Although four ISPs and remote locations are shown, any number of ISPs and remote locations can be used. For example, two or more nodes may share a single ISP.

Still referring to the peer-to-peer implementations, the first node 210 is further provided with a peer-to-peer (P2P) networking capability, such as, for example, a torrent-type protocol such as BitTorrent® (registered trademark of BITTORRENT, INC. in the United States, other countries, or both). The P2P capability may be embodied in at least one of hardware, firmware, and software of the computing device of the first node 210. As is understood by those of skill in the art, torrent-type P2P protocols allow a device to separately download portions of a desired file from any of various remote locations, and then re-assemble the portions into the desired file.

The first node 210 may utilize the bandwidth of the other nodes 215, 220, 225 to increase the rate of data transfer between itself and the Internet. This is accomplished by the first node 210 instructing each node 215, 220, 225 to download a respective portion of the file and transfer that portion to the first node 210. The first node 210 then assembles the portions into the desired file using the torrent-type protocol. In this manner, the first node 210 overcomes its limited "skinny pipe" connection to the Internet by creating a "virtual fat pipe" by employing the bandwidth of the other nodes 215, 220, 225.

Figure 2D:
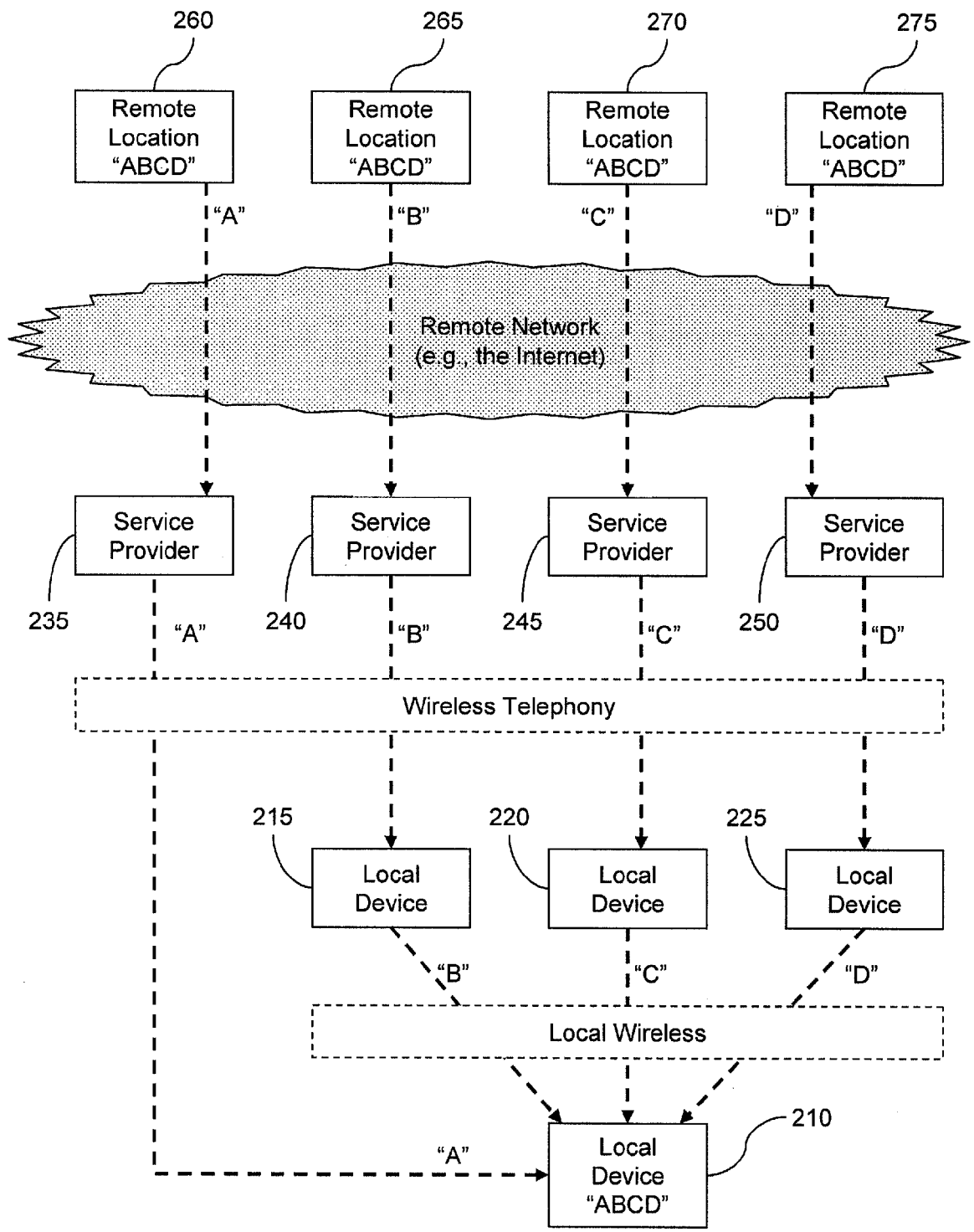

As depicted in FIG. 2D, a file made up of portions "ABCD" resides at each remote location 260, 265, 270, 275. The first node 210 downloads a first portion "A" of the file from the first remote location 260, the second node 215 downloads a second portion "B" from the second remote location 265, the third node 220 downloads a third portion "C" from the third remote location 270, and the fourth node 225 downloads a fourth portion "D" from the fourth remote location 275. The second, third, and fourth nodes transfer the respective portions to the first node, which reassembles the portions "A", "B", "C", "D" into the file "ABCD" using, for example, known torrent-type techniques.

As can be seen from the above-described example, the first node 210 uses the bandwidth of the other nodes 215, 220, 225 to effectuate a parallel, instead of serial, download of the file "ABCD". In this manner, such peer-to-peer ad hoc networks allow for faster downloading of the file to the first node 210.

To illustrate the improvement, assume file "ABCD" is 300 megabytes (MB) in size, and each node 210, 215, 220, 225 has a 1 megabit per second (Mbps) connection to its respective ISP. Further assume that the first node 210 has a 54 Mbps connection to each other node 215, 220, 225. In such a scenario, it would take about forty minutes for the first node 210 to download the file "ABCD" when acting alone. However, when the first node 210 utilizes the bandwidth of the other nodes 215, 220, 225, the download time in this example is reduced to about four minutes. It is noted that the number of nodes, ISPs, remote locations, and file portions described above are merely exemplary, and the peer-to-peer ad hoc network may be practiced with any appropriate number of nodes, ISPs, remote locations, and file portions.

Figure 3A:
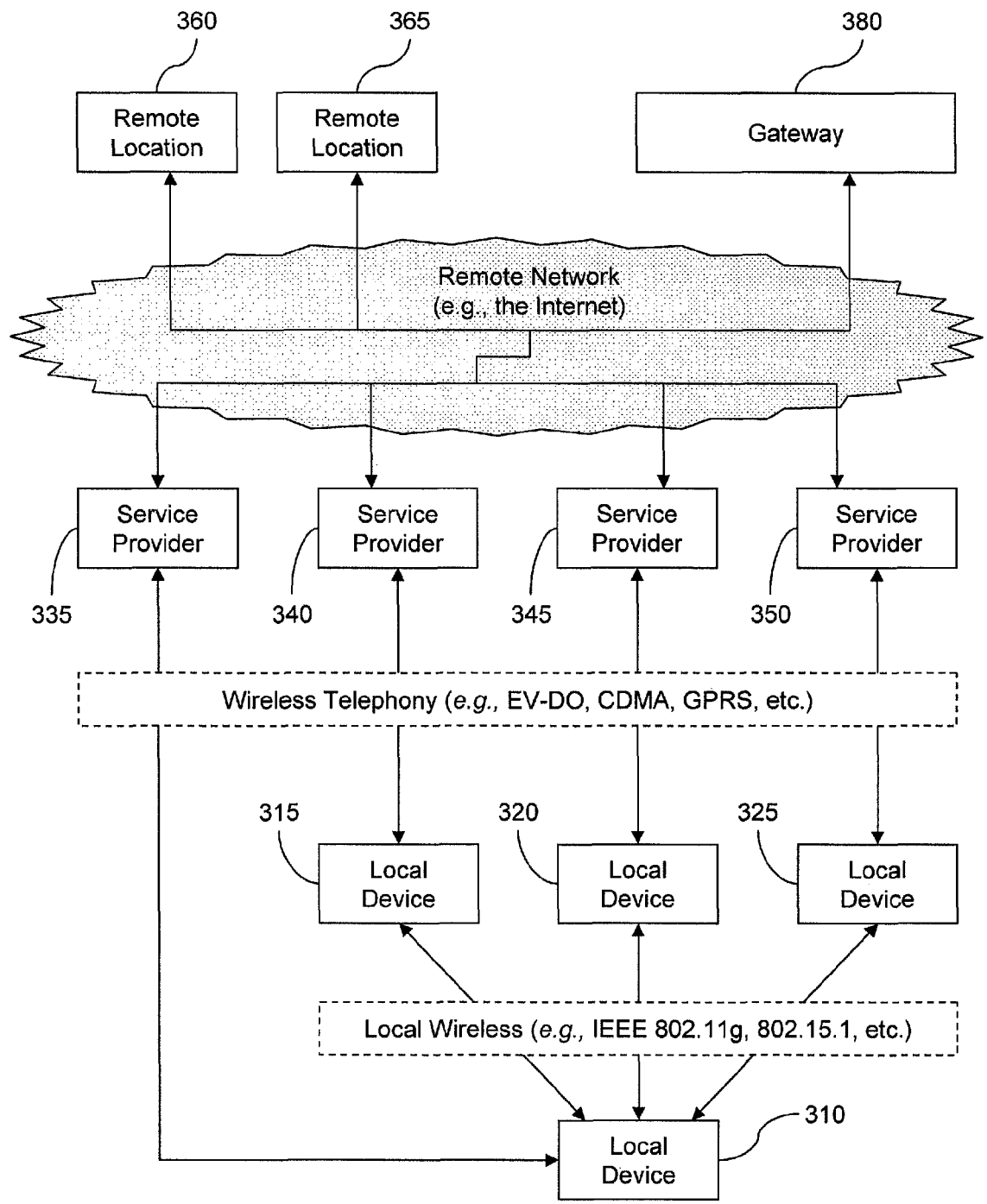
FIGS. 3A through 3C show gateway bandwidth-sharing ad hoc networks according to aspects of the invention.

FIG. 3A shows an overview of a gateway bandwidth sharing architecture. In embodiments, a system comprises nodes 310, 315, 320, 325 and associated service providers (e.g., ISPs) 335, 340, 345, 350. Also shown is a first remote location 360 and a second remote location 365 of a remote network (e.g., the Internet). The nodes 310, 315, 320, 325, ISPs 335, 340, 345, 350, and remote locations 360, 365 are similar to those described above with respect to FIGS. 2A through 2D, such that the nodes may communicate with each other using local wireless protocols, the nodes may communicate with the ISPs using wireless telephony (e.g., cellular) protocols, and the ISPs may communicate with the remote locations over the remote network. The number of nodes, ISPs, and remote locations shown in FIG. 3A is merely exemplary, and any suitable number of nodes, ISPs, and remote locations may be used within the scope of the invention.

Also depicted in FIG. 3A is a gateway 380. In embodiments, the gateway 380 comprises any suitable computing device (such as, for example, that described with respect to FIG. 1) that is capable of data transfer with the ISPs 335, 340, 345, 350 and the remote locations 360, 365. For example, the gateway 380 may comprise a server that is connected to the ISPs 335, 340, 345, 350 and remote location 360, respectively, by a high speed connection (e.g., T3, cable, DSL, fiber, etc.). In implementations, the gateway 380 possesses a bandwidth that is equal to or greater than the collective bandwidth of the nodes 310, 315, 320, 325, such that the gateway can facilitate substantially parallel data transfer to the nodes.

In embodiments, the gateway 380 further comprises file splitting and joining functionality. That is, the gateway 380 may operate to split a single data file into multiple smaller files that can later be joined to re-create the original file. Such splitting and joining functionality may be embodied in any combination of hardware and software of the gateway 380 computing device, and is known such that it does not require further explanation here. Moreover, the splitting and joining functionality may be performed on an suitable type of data file, such as text files, audio files, video files, documents, spreadsheets, etc. The splitting of a file may be thought of as a type of multiplexing, and, hence, the gateway 380 may also be referred to as a multiplexed gateway and/or a gateway multiplexer. Furthermore, although the splitting (e.g., multiplexing) and joining (e.g., demultiplexing) described herein differs from the torrent-type techniques referred to with respect to FIGS. 2C and 2D, the gateway 380 may additionally comprise torrent-type funcationality.

Figure 3B:
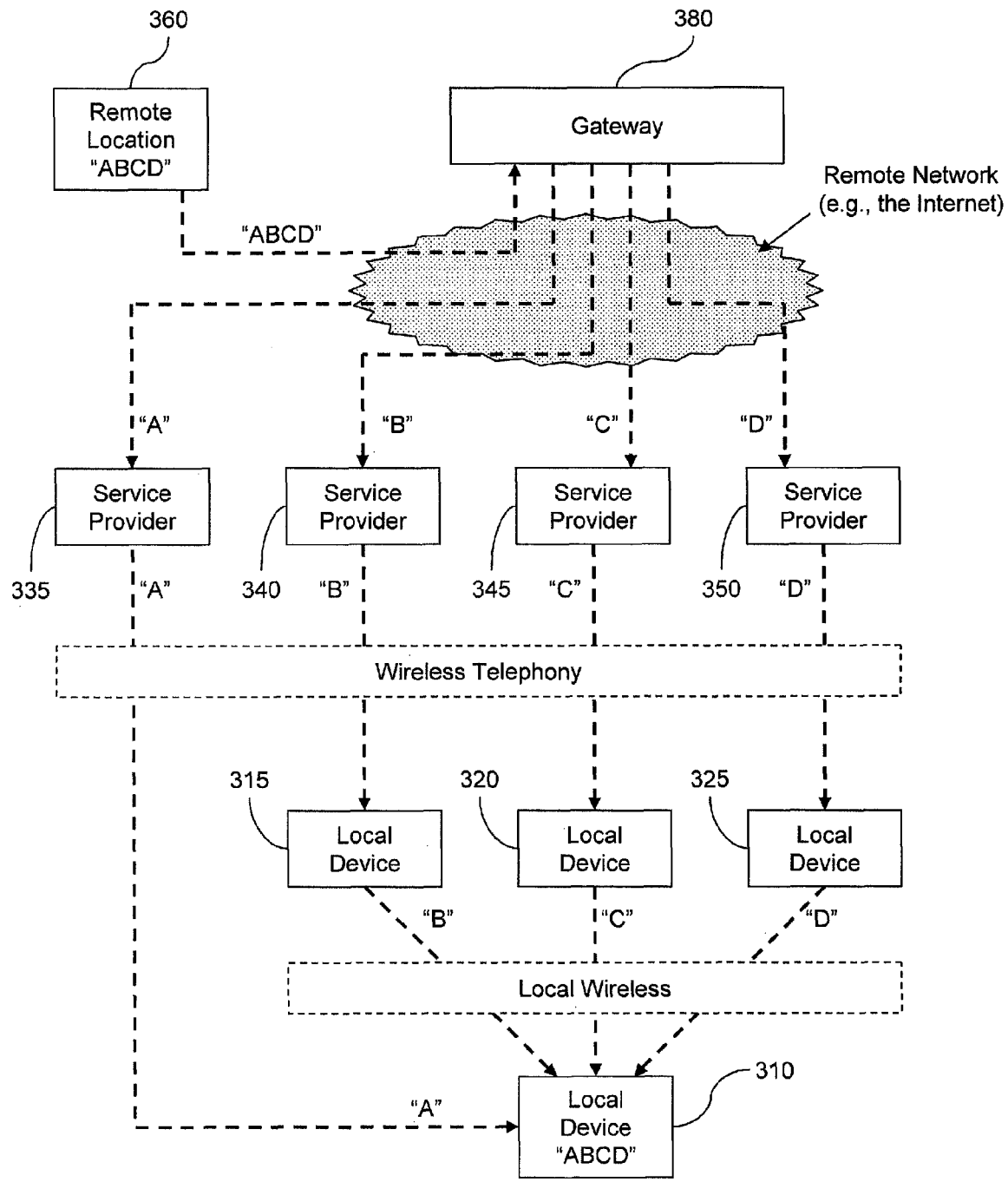

As depicted in FIG. 3B, a file made up of portions "ABCD" resides at remote location 360. The gateway 380 downloads the entire file "ABCD" from remote location 360 and splits the file into first portion "A", second portion "B", third portion "C", and fourth portion "D". The gateway sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions "A", "B", "C", "D" into the file "ABCD" using, for example, known file rejoining techniques.

As can be seen from the above-described example, the first node 310 uses the bandwidth of the other nodes 315, 320, 325 to effectuate a parallel, instead of serial, download of the file "ABCD". In this manner, the invention allows for faster downloading of the file to the first node 310.

To illustrate the improvement, assume file "ABCD" is 300 megabytes (MB) in size, and each node 310, 315, 320, 325 has a 1 megabit per second (Mbps) connection to its respective ISP. Further assume that the first node 310 has a 54 Mbps connection to each other node 315, 320, 325. In such a scenario, it would take about forty minutes for the first node 310 to download the file "ABCD" when acting alone. However, when the first node 310 utilizes the bandwidth of the other nodes 315, 320, 325 in accordance with the invention, the download time in this example is reduced to about four minutes. It is noted that the number of nodes, ISPs, remote locations, and file portions described above are merely exemplary, and the invention may be practiced with any appropriate number of nodes, ISPs, remote locations, and file portions.

Figure 3C:
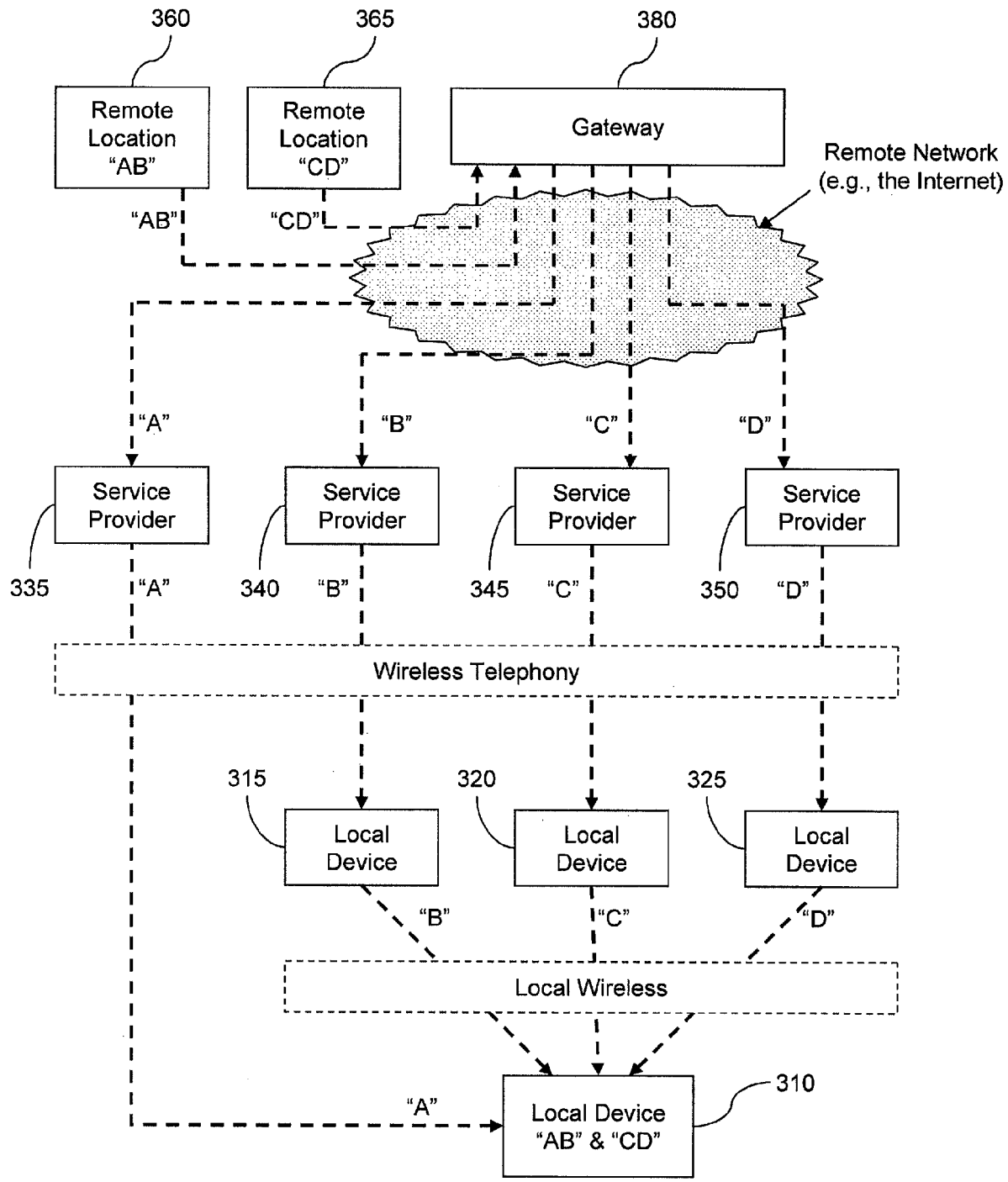

An even further embodiment is shown in FIG. 3C, in which plural files may be downloaded according to aspects of the invention. A first file "AB" resides at first remote location 360, and a second file "CD" resides at second remote location 365. The gateway 380 downloads the entire file "AB" from the first remote location 360 and the entire file "CD" from the second remote location. The gateway 380 splits the first file "AB" into portions "A" and "B", and splits the second file "CD" into portions "C" and "D". The gateway 380 sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions into files "AB" and "CD" using, for example, known file rejoining techniques.

Initial Formation Of The Ad Hoc Network

In either the peer-to-peer or gateway environments described above, in order to form a new ad hoc network, a borrower may scan all available potential lenders and prioritize the potential lenders for a data transfer. The formation of the ad hoc network, in embodiments, may use a 'borrower/lender' table as shown in FIG. 4. In this example, the borrower or multiplexer will broadcast the table to potential lenders which, in turn, will return the table, with information pertinent to the lender, to the borrower or the multiplexer. Using this information, the borrower or lender can establish an ad hoc network with lenders that meet certain criteria, e.g., reliability, speed, availability and/or costs. In this manner, in embodiments, the borrower may select lenders based upon factors in addition to a potential lender's available bandwidth.

In the borrower/lender table of FIG. 4, the "Node Name" column may be the unique identifier of a node such as the borrow and lenders. For example, this could be a hostname, a Bluetooth® name or any other information that can uniquely describe the node. The "Node Type" column may describe whether this node is a borrow, a lender, or a multiplexer. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Processes Of The Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
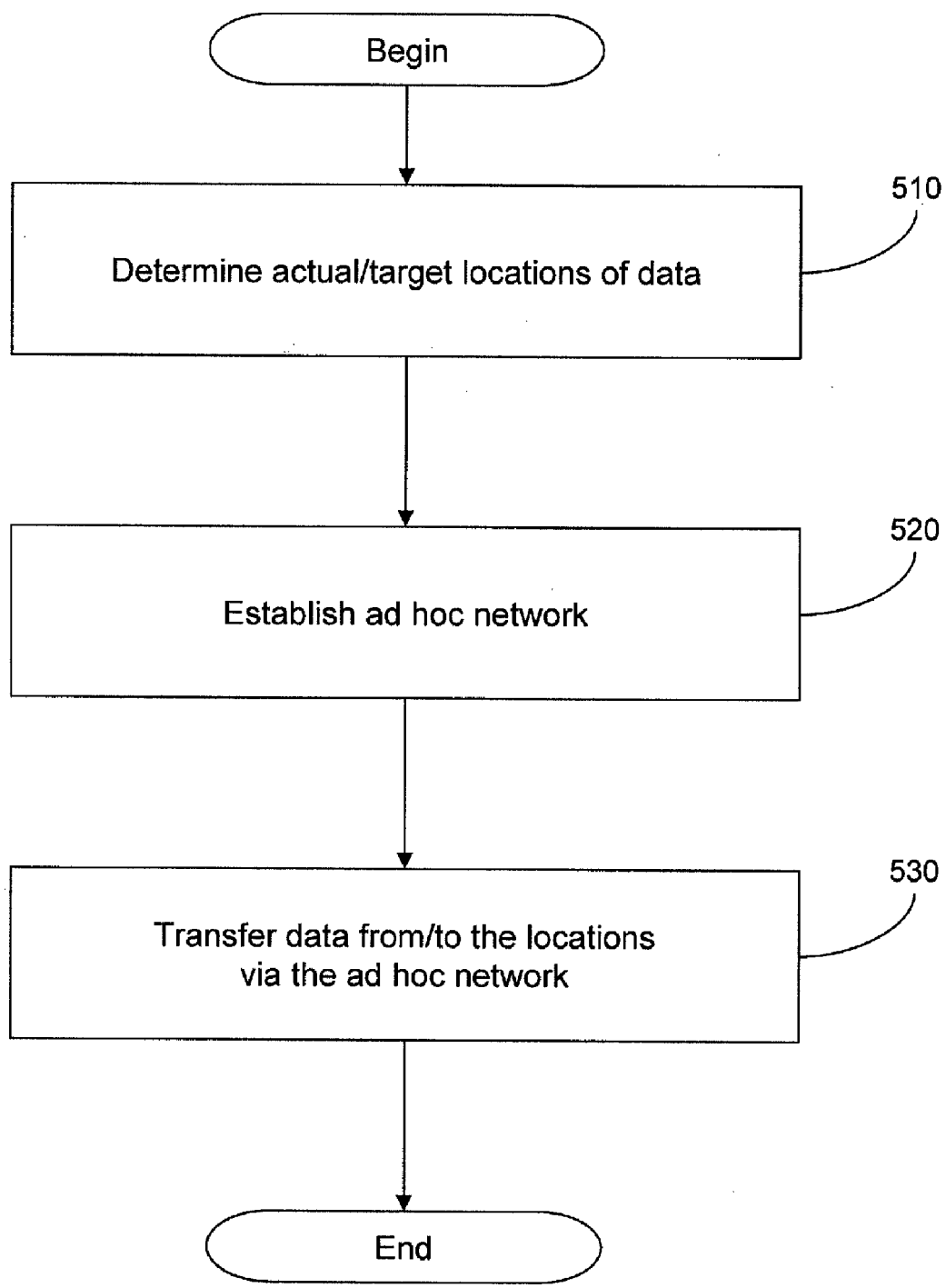
FIGS. 5-9 show flow diagrams depicting implementations of methods according to aspects of the invention.

FIG. 5 shows a flow diagram depicting steps of a first method for transferring data according to aspects of the invention. At step 510, a borrower determines locations of desired data on a remote network. In embodiments, the borrower is a node (e.g., comprises a wireless computing device that can communicate with other local devices and also with the remote network) as described above. The remote network may be, for instance, the Internet. The borrower determines the locations of data in any suitable manner, such as, for example, a web search, P2P search, etc. The desired data may be in the form of a file that is stored at plural locations, portions of a file stored at plural locations, or plural different files stored at plural locations. The locations may comprise any computing device that is capable of storing data and transferring data in the remote network, such as, for example, a desktop computer, server, etc. For example, the locations may comprise a server located at a first physical location and a desktop computer located at a second physical location different from the first location. As a further example, the locations may comprise blades in a blade server. As an even further example, the locations may comprise a single computing device that is capable of sustaining multiple connections to the remote network.

At step 520, the borrower establishes an ad hoc network to facilitate enhanced downloading of the desired data. In embodiments, this is accomplished by the borrower communicating with local nodes, and may be accomplished as described above with respect to FIGS. 2A through 4. For example, the borrower may find other local nodes using a find utility that is comprised in any of the IEEE 802.11a , 802.11b, 802.11g, 802.15.1(i.e., Bluetooth.RTM.), 802.15.4(e.g., Zigbee.RTM.), etc., protocols. The borrower may then ask the found nodes for assistance, which may comprise, for example, telling a found node the remote location of the desired data, asking the found node if it can communicate with the remote location, and asking the found node if it has excess bandwidth that can be utilized on behalf of the borrower. Illustrative cases of establishing the ad hoc network are set forth in co-pending application Ser. No. 11/755,775, and co-pending application Ser. No. 11/755,802. The establishment of the ad hoc network results in the identification of certain of the found nodes that will act as lenders for the borrower.

At step 530, the desired data is transferred from the remote locations to the borrower via the established ad hoc network. In embodiments, this comprises each lender downloading a respective portion of the desired data from a remote location, and then forwarding that respective portion to the borrower over a local wireless connection. Step 530 may comprise, for example, the borrower instructing each particular lender to download a respective particular portion of the desired data from a respective remote location.

Still referring to step 530, the lenders download the assigned data portions from the remote location, or locations, in any suitable manner, such as, for example, using a wireless telephony communication with an ISP that, in turn, communicates with the remote location. Moreover, the lenders transfer the respective data portions to the borrower using any suitable local wireless communication protocol. If the data portions are fragments of a single file, the borrower may re-assemble the fragments using known torrent-type techniques. Alternatively, if each data portion is a stand-alone file, then the borrower merely receives the files.

In implementations, the method described above with respect to steps 510, 520, and 530 may similarly be used to upload data from the borrower to various remote locations. For example, the borrower may determine the various target locations, establish the ad hoc network, transfer a respective portion of data to each lender, and instruct each lender to upload its respective portion to an assigned target location.

In further implementations, the borrower and lender(s) communicate directly with each other, without the use of intermediary parties or devices. It is contemplated within the scope of the invention, however, that the borrower and lender(s) may communicate indirectly with each other through the use of intermediary parties or devices.

The following are detailed examples of the general method that is described above with respect to FIG. 5.

Same Data At Plural Locations

Figure 6:
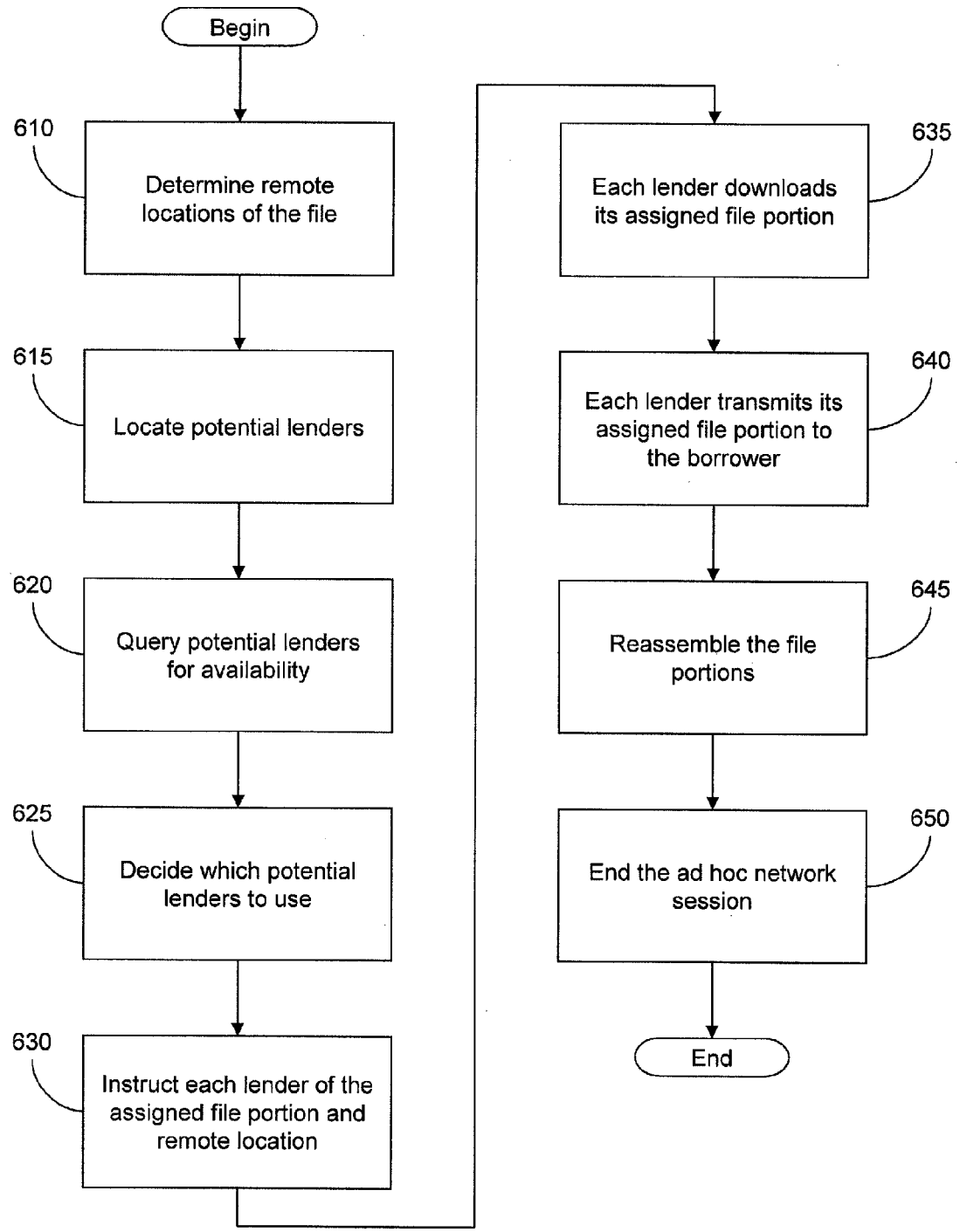

FIG. 6 shows a flow diagram depicting steps of a first implementation of a method for transferring data according to aspects of the invention. In this implementation, the same data is stored at plural locations on a remote network (e.g., the Internet). At step 610, the borrower determines the location or locations of the data on the remote network. As described above, this may be accomplished in any suitable manner, such as, for example, via web search, P2P network search, etc. In this example, the data comprises a file that is partitionable into fragments via torrent-type techniques.

At step 615, the borrower locates potential lenders within its local wireless connection range. In embodiments, this is accomplished by the borrower using a find utility to locate other wireless devices that it can communicate with using local wireless protocols such as, for example, IEEE 802.11a, 802.11b, 802.11g, 802.15.1, 802.15.4, etc.

At step 620, the borrower queries the found local nodes (e.g., potential lenders) for availability of lending bandwidth. In embodiments, this comprises the borrower broadcasting locations of the desired data and a request for bandwidth to the potential lenders via the local wireless protocols. Each potential lender determines which, if any, of the remote locations it can communicate with through its respective ISP. Each potential lender also determines if it has bandwidth to spare (e.g., lend to the borrower). Each potential lender responds to the borrower with a report of which remote locations they can communicate with and how much bandwidth they have available to spare. In implementations, if a potential lender is selling bandwidth for use by the borrower, the potential lender may also respond with a price of the bandwidth that is being offered.

Still referring to step 620, in embodiments, a potential lender may selectively deny lending bandwidth based upon factors such as the type of file to be downloaded, the user making the request, etc. For example, if a potential lender decides to deny lending bandwidth to the borrower, then the potential lender may respond that it has no bandwidth available, or, simply may not respond at all.

At step 625, upon receipt of the above-described information from the potential lenders, the borrower decides which of the potential lenders to use and how to use the lenders. In embodiments, this comprises the borrower determining how many lenders to use and how to partition the data amongst the lenders. For example, optimization techniques for such a determination may be based upon factors such as minimization of cost, minimization of download time, minimization of risk of losing a connection with a lender, etc. Illustrative cases of optimization are set forth in co-pending application Ser. No. 11/755,802.

Still referring to FIG. 6, at step 630, the borrower communicates to each lender its assigned data portion for download and the location for the lender to download from. In embodiments, this communication is performed by the borrower sending a command to each lender using the local wireless communication protocols.

At step 635, each lender downloads its assigned portion from its assigned location. In embodiments, this is performed by each lender downloading the assigned portion from the assigned remote location via its respective ISP.

At step 640, each lender transmits its assigned portion to the borrower using the local wireless communication protocols. It is noted that a particular lender need not wait for all other lenders to complete step 635 before transmitting to the borrower. For example, a lender may send its data to the borrower as soon as it has completed its download from the remote location, even if that happens before other lenders complete their downloads. Moreover, each lender need not wait until it has completely downloaded its file portion from the remote location to begin transmitting to the borrower. That is, a lender may transmit as the data comes in, essentially acting as a conduit for streaming data from the remote location to the borrower.

At step 645, the borrower reassembles the portions of data that it received from the lenders in step 640. In embodiments, this is accomplished using torrent-type reassembly techniques. Upon completion of the reassembly, the borrower has a complete copy of the desired data.

At step 650, the borrower ends the session with each lender. In embodiments, this comprises sending a message to each lender that the download is complete. This may also comprise payment, either directly or indirectly to a lender or a third party, for the use of the lenders' bandwidth.

Different Data At Plural Locations

Figure 7:
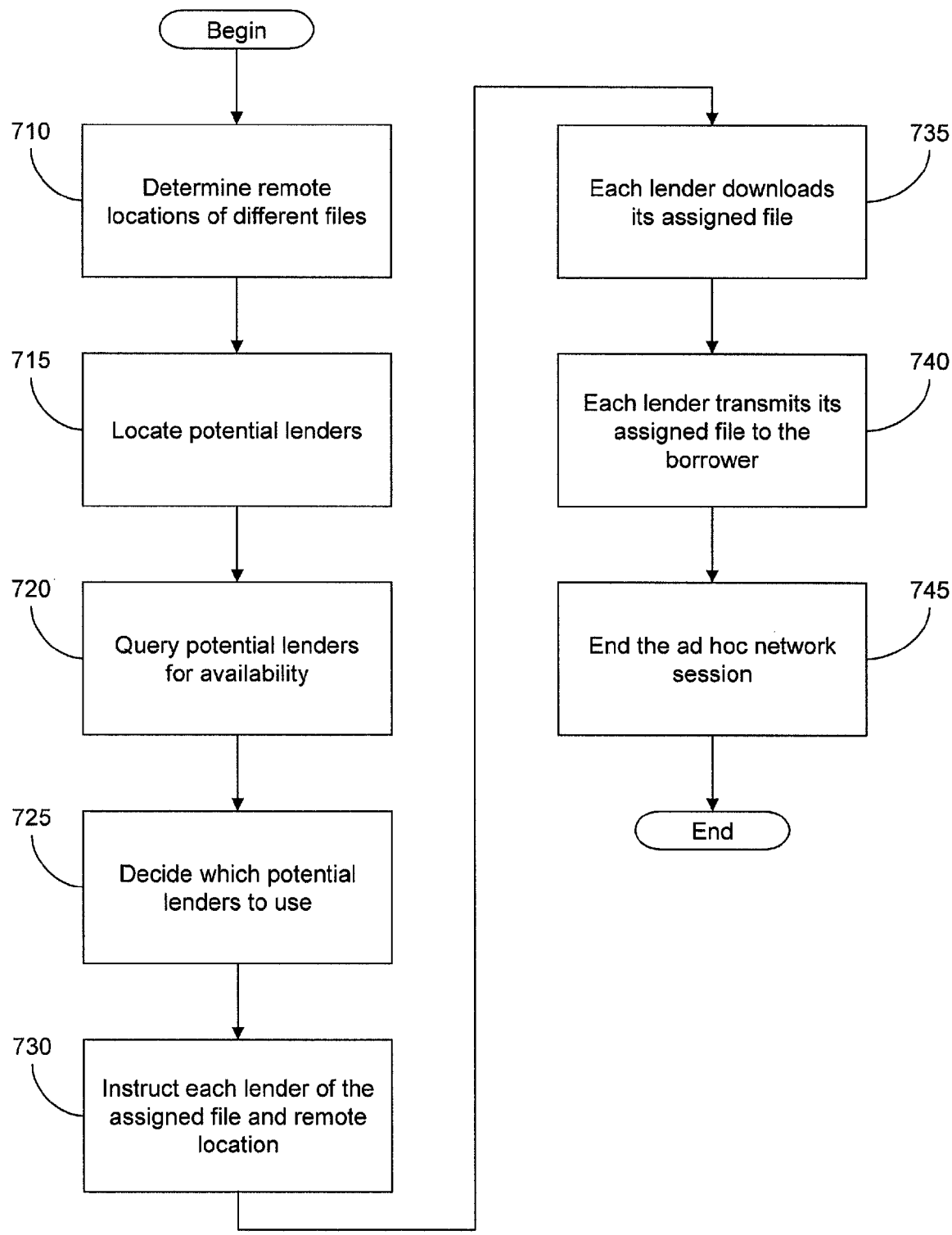

FIG. 7 shows a flow diagram depicting steps of a second implementation of a method for transferring data according to aspects of the invention. In this implementation, different data is stored at plural locations on a remote network (e.g., the Internet). At step 710, the borrower determines the locations of the data on the remote network. As described above, this may be accomplished in any suitable manner, such as, for example, via web search, P2P network search, etc. In this example, the data comprises plural complete files that are each stored at different locations remote from the borrower.

At step 715, the borrower locates potential lenders in its proximity. At step 720, the borrower queries the potential lenders for availability of lending bandwidth. At step 725, upon receipt of the responses from the potential lenders, the borrower decides which of the potential lenders to use and how to use the lenders. In embodiments, these steps are accomplished in a similar manner as steps 615, 620, and 625, respectively, as described above with respect to FIG. 6.

At step 730, the borrower communicates to each lender its assigned file to download and the location for the lender to download the file from. In embodiments, this communication is performed by the borrower sending a command to each lender using the local wireless communication protocols.

At step 735, each lender downloads its assigned file from its assigned location. In embodiments, this is performed by each lender downloading the assigned file from the assigned remote location via its respective ISP.

At step 740, each lender transmits its assigned file to the borrower using the local wireless communication protocols. As with step 640 described above with respect to FIG. 6, a particular lender need not wait for all other lenders to complete step 735 before transmitting to the borrower. Moreover, because each lender downloads a complete file instead of only a portion of a file, there is no need for the borrower to re-assemble file portions, as previously described with respect to FIG. 6. Thus, there is no requirement for torrent-type capability in this implementation.

At step 745, the borrower ends the session with each lender. In embodiments, this is accomplished in a similar manner as step 650 described above with respect to FIG. 6.

Combination Implementation

Figure 8:
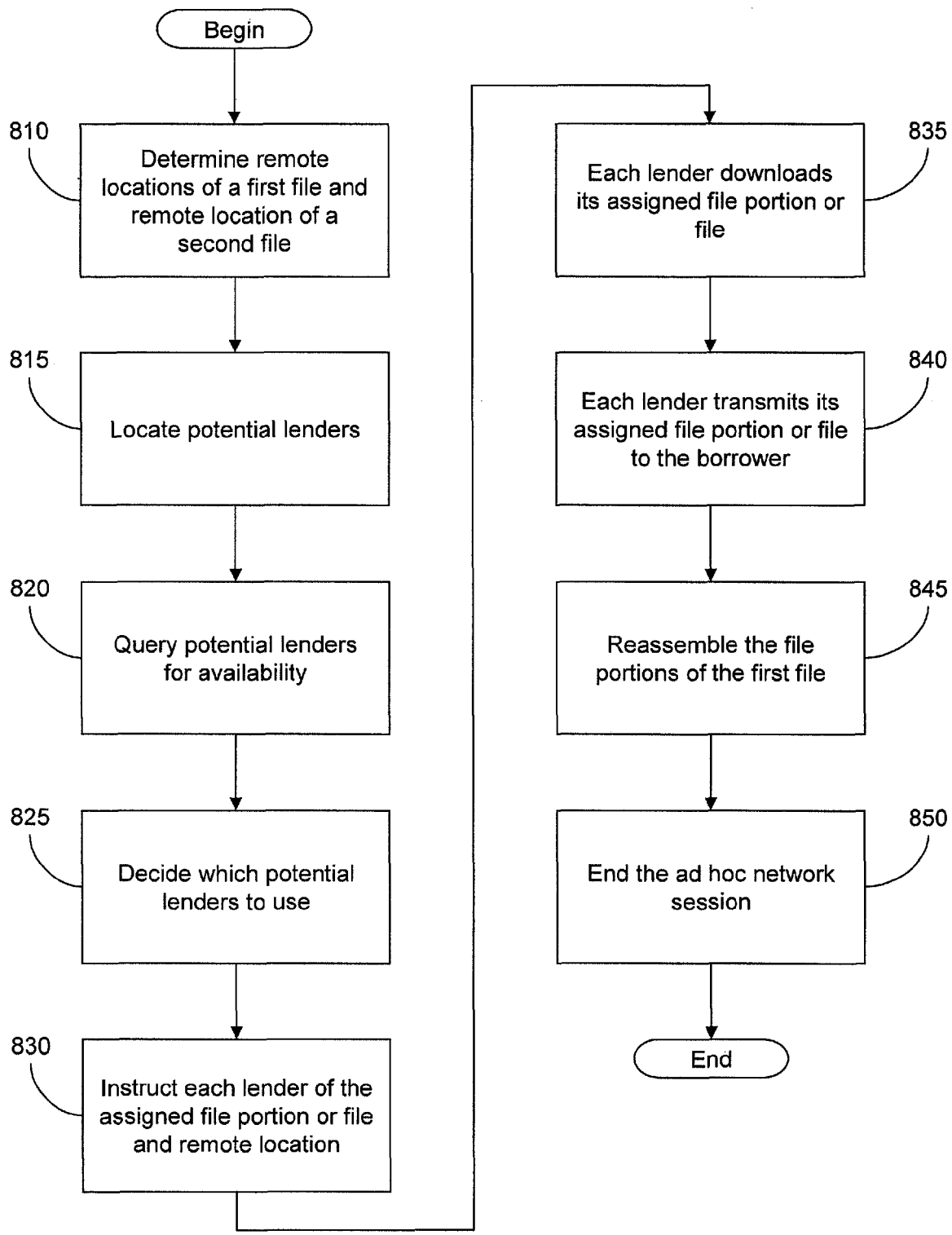

FIG. 8 shows a flow diagram depicting steps of a third implementation of a method for transferring data according to aspects of the invention. In this implementation, the same data is stored at plural locations on a remote network and different data is stored at another location on the remote network (e.g., the Internet). For example, file "AB" may be stored at two locations, and file "CD" may be stored at a third location. At step 810, the borrower determines the locations of the data on the remote network. As described above, this may be accomplished in any suitable manner, such as, for example, via web search, P2P network search, etc.

At step 815, the borrower locates potential lenders in its proximity. At step 820, the borrower queries the potential lenders for availability of lending bandwidth. At step 825, upon receipt of the responses from the potential lenders, the borrower decides which of the potential lenders to use and how to use the lenders. In embodiments, these steps are accomplished in a similar manner as steps 615, 620, and 625, respectively, as described above with respect to FIG. 6.

At step 830, the borrower communicates to each lender its assigned file or file portion for download and the location for the lender to download the file or file portion from. In embodiments, this communication is performed by the borrower sending a command to each lender using the local wireless communication protocols. For example, the borrower may instruct a first lender to download portion "A" from a first location. The borrower may further instruct a second lender to download portion "B" from a second location. And the borrower may instruct a third lender to download complete file "CD" from a third location.

At step 835, each lender downloads its assigned file or file portion from its assigned location. In embodiments, this is performed by each lender downloading the assigned file or file portion from the assigned remote location via its respective ISP.

At step 840, each lender transmits its assigned file or file portion to the borrower using the local wireless communication protocols. As with step 640 described above with respect to FIG. 6, a particular lender need not wait for all other lenders to complete step 835 before transmitting to the borrower.

At step 845, the borrower reassembles portions "A" and "B" into file "AB". In embodiments, this is accomplished using torrent-type reaasembly methods. There is no need to reassemble file "CD" because it is downloaded and transferred to the borrower as a complete file.

At step 850, the borrower ends the session with each lender. In embodiments, this is accomplished in a similar manner as step 650 described above with respect to FIG. 6.

Upload Data to Plural Locations

Figure 9:
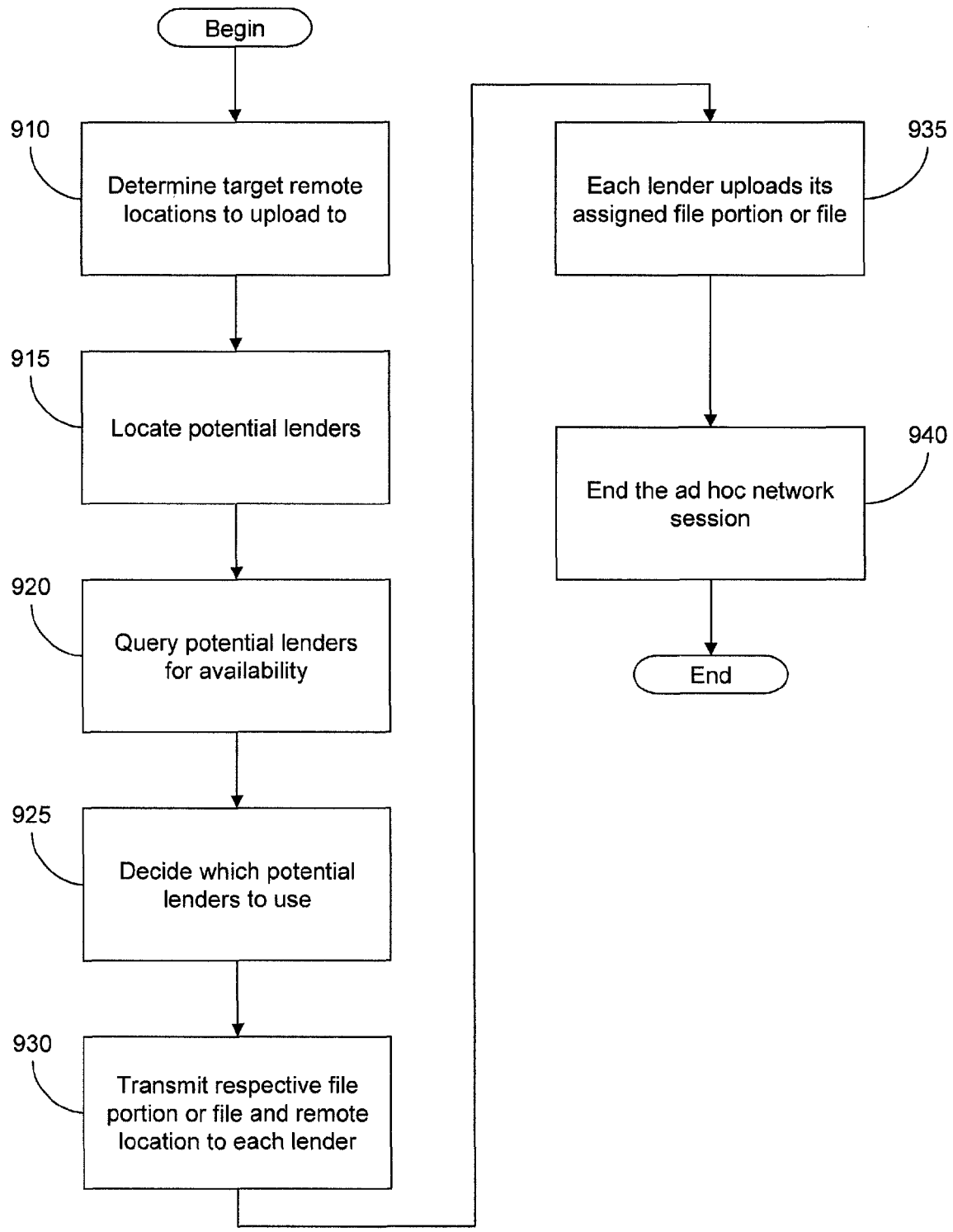

FIG. 9 shows a flow diagram depicting steps of a fourth implementation of a method for transferring data according to aspects of the invention. In this implementation, instead of downloading data, the borrower is uploading data to a location or locations on a remote network. For example, the borrower may wish to send data portion "A" to a first location and data portion "B" to a second location. The data portions may be fragments of a single file or may be complete files. At step 910, the borrower determines the target locations on the remote network. This may be accomplished in any suitable manner, such as, for example, via web search, P2P network search, etc.

At step 915, the borrower locates potential lenders in its proximity. In embodiments, this is accomplished in a similar manner as step 615 as described above with respect to FIG. 6.

At step 920, the borrower queries the potential lenders for availability of lending bandwidth. This is performed similar to step 620 as described above, except that in step 920 the borrower is asking the potential lenders of their availability to upload data to a target location. As with step 620, a potential lender may respond to the borrower with availability, price, etc.

At step 925, upon receipt of the responses from the potential lenders, the borrower decides which of the potential lenders to use and how to use the lenders. In embodiments, this is accomplished in the a manner similar to 625 as described above with respect to FIG. 6.

At step 930, the borrower transmits the respective data portion and target location to each lender. In embodiments, this comprises sending the respective data portions and instructions to the respective lenders via the wireless communication protocol. For example, the borrower may send data portion "A" to a first lender along with an instruction to upload data portion "A" to a first remote Internet location. The borrower may also send data portion "B" to a second lender along with an instruction to upload data portion "B" to a second remote Internet location.

At step 935, the lenders upload their respective data portions to the assigned remote locations. In embodiments, this is accomplished by sending the data portion to the remote location via an ISP.

At step 940, the session is ended. In embodiments, this comprises each lender sending a message to the borrower that the data portion was successfully uploaded. Alternatively, or additionally, the borrower may examine the target locations to determine that the data portions were successfully uploaded. As described above, payment for services may be made at this point.

In embodiments of the invention, each device of an ad hoc network comprises hardware and/or software that performs some or all of the functions described herein. For example, a wireless device may download and install a software application that allows the wireless device to broadcast requests for borrowing bandwidth, respond to requests for borrowing bandwidth, choose from potential lenders, etc. Such software may, for example, be created by and available for download from a service provider.

In any of the examples and implementations described above, the lending of bandwidth may be performed for free or based upon some form of payment, either directly or indirectly, form the borrower to the lender or a third party. If payment methods are used, fixed-price payment policies may be established based upon factors such as: volume of data transferred by a lender for a borrower, amount of time a lender is transferring data for a borrower, etc.

Moreover, variable price payment policies may be established as an alternative to the above-described fixed-price payment policies. For example, a price may be negotiated between a borrower and lender.

Additionally or alternatively, in any of the examples and implementations described above, a borrower's ability to borrow bandwidth from lenders may be subject to fair sharing strategies. For example, a points system may be implemented where a borrower must have sufficient points in an account to be able to borrow bandwidth from a lender. Borrowers may obtain points by acting as lenders for other borrowers, or by purchasing points from a service provider.

In implementations of the invention, the borrower is directly connected to each lender by a local wireless connection, as opposed to be indirectly connected by an intermediary, proxy, or other device. That is, each lender downloads an assigned file portion and sends it directly to the borrower. As such, each lender acts as its own proxy and is directly connected to the borrower so that the borrower is provided with enhanced monitoring capability over the status of the data transfer performed by each lender.

In further implementations, through use of a borrower/lender table, the borrower may choose lenders on factors beyond mere ability to lend bandwidth. Such factors (e.g., minimizing time, minimizing cost, etc.) allow a borrower to achieve enhanced objectives, beyond mere data transfer. Moreover, the borrower can divide the lenders into groups according to their capabilities. In this manner, certain groups of lenders may be assigned exclusively for certain tasks. For example, the borrower can select the list of lenders who have video streaming capabilities and then assign each of them with a download task. Then, other lenders, who may not have any specialties, can be utilized for web surfing.

In even further implementations, the borrower may assign data portions to respective lenders after the discovery of potential lenders. As such, the borrower may optimize the data apportionment to meet the borrower's objectives. This allows a borrower to apportion a file amongst lenders according to the capability of each lender, in ways beyond merely assigning equal sized portions to each lender.

In yet further implementations, the potential lenders are aware of the target data location before they agree to become a lender. In this manner, a potential lender may refuse to lend bandwidth to a borrower.

In still further implementations, the discovery of potential lenders is performed once at the beginning of the data transfer process, and no further discovery of potential lenders is necessary unless a lender fails to fulfill his or her assigned data transfer.

While the invention has been described in terms of embodiments, those skilled in the art will recognize that the invention can be practiced with modifications and in the spirit and scope of the appended claims. For example, while the embodiments have been described with one, two, or three lenders, those skilled in the art will recognize that the invention can be practiced with any number of lenders, files, file portions, ISPs, and/or remote locations.

What is claimed is:

1. A method, comprising:
   determining a first location and a second location of data;
   instructing a first device to download a first portion of the data from the first location;
   instructing a second device to download a second portion of the data from the second location; and
   receiving the first portion of the data from the first device and the second portion of the data from the second device,
   wherein a borrower comprises a borrower device in communication with a remote network;
   at least one local device comprises the first device and the second device in communication with the remote network and the borrower device; and
   the first device and the second device lend bandwidth to the borrower device for downloading data from or uploading data to the remote network.

2. The method of claim 1, wherein the receiving comprises transmission using a local wireless communication protocol.

3. The method of claim 2, wherein the downloading comprises transmission using a wireless telephony protocol.

4. The method of claim 1, wherein the first location is a first remote location and the second location is a second remote location different from the first remote location.

5. The method of claim 1, wherein the first portion of the data and the second portion of the data are fragments of a file and the first portion of the data is different from the second portion of data.

6. The method of claim 5, wherein the first location comprises a copy of the file and the second location comprises an other copy of the file.

7. The method of claim 5, further comprising reassembling the received first portion of the data and the second portion of the data.

8. The method of claim 1, wherein the first portion of the data comprises a first file and the second portion of the data comprises a second file.

9. The method of claim 1, wherein the steps of claim 1 are provided by a service provider under a subscription and/or fee agreement and/or based on advertising content to one or more third parties.

10. The method of claim 1, wherein a service provider at least one of creates, maintains, deploys and supports a computer infrastructure that performs the steps of claim 1.

11. The method of claim 1, further comprising locating potential lenders.

12. The method of claim 11 further comprising querying the potential lenders for availability of sharing bandwidth.

13. The method of claim 12, further comprising choosing the first device and the second device from the potential lenders.

14. A method, comprising:
    determining a first target location and a second target location;
    locating potential lenders;
    querying potential lenders for availability of sharing bandwidth;
    transmitting a first portion of data and instruction to upload the first portion of data to the first target location to a first lender; and
    transmitting a second portion of data and instruction to upload the second portion of data to the second target location to a second lender,
    wherein a borrower comprises a first device in communication with a remote network;
    at least one local device comprises the first lender and the second lender in communication with the remote network and the first device; and
    the first lender and the second lender lend bandwidth to the first device for downloading data from or uploading data to the remote network.

15. The method of claim 14, wherein the transmitting a first portion of data and the transmitting a second portion of data comprises transmitting using at least one local wireless communication protocol.

16. The method of claim 15, wherein the uploading the first portion of data and the uploading the second portion of data comprises transmission using at least one wireless telephony protocol.

17. The method of claim 14, wherein the first target location is a first remote location and the second target location is a second remote location different from the first remote location.

18. The method of claim 14, wherein the steps of claim 14 are provided by a service provider under a subscription and/or fee agreement and/or based on advertising content to one or more third parties.

19. The method of claim 14, wherein a service provider at least one of creates, maintains, deploys and supports a computer infrastructure that performs the steps of claim 14.

20. A method, comprising:
    determining actual or target remote locations of data;
    establishing an ad hoc network through direct wireless connections to at least one local device, wherein the establishing the ad hoc network comprises asking the at least one local device whether the at least one local device can communicate with the actual remote locations or the target remote locations; and
    receiving data from the actual remote locations or transmitting data to the target remote locations via the at least one local device,
    wherein a borrower comprises a first device in communication with a remote network;
    the at least one local device comprises a second device in communication with the remote network and the first device; and
    the second device lends bandwidth to the first device for downloading data from or uploading data to the remote network.

21. The method of claim 20, wherein the at least one local device comprises wireless devices.

22. The method of claim 20, wherein the receiving data from the actual remote locations comprises:
    transmission from the actual remote locations to the at least one local device using at least one wireless telephony communication protocol; and
    transmission from the at least one local device to a borrower using at least one local wireless communication protocol.

23. The method of claim 20, wherein the transmitting data to the target remote locations comprises:
    transmission from a borrower to the at least one local device using at least one local wireless communication protocol; and transmission from the at least one local device to the target remote locations using at least one wireless telephony communication protocol.

24. The method of claim 20, wherein the establishing an ad hoc network comprises locating potential lenders.

25. The method of claim 24, wherein the establishing an ad hoc network further comprises querying the potential lenders for availability of sharing bandwidth.

26. The method of claim 25, wherein the establishing an ad hoc network further comprises choosing the at least one local device from the potential lenders.

27. A computer program product comprising a computer usable storage medium having readable program code embodied in the medium, the computer program product includes at least one component to:
   determine a target remote location of data;
   establish an ad hoc network amongst a borrower and at least one local device, wherein the ad hoc network comprises communication between the borrower and the at least one local device via local wireless communication protocol;
   instruct the at least one local device to upload the data to the target remote location via wireless telephony protocol on behalf of the borrower; and
   determine whether the data was successfully uploaded by examining the target remote location,
   wherein the borrower comprises a first device in communication with a remote network;
   the at least one local device comprises a second device in communication with the remote network and the first device; and
   the second device lends bandwidth to the first device for downloading data from or uploading data to the remote network.

28. A system, comprising:
   a computer infrastructure comprising a combination of hardware and software being configured to:
      determine actual or target remote locations of data;
      establish an ad hoc network amongst a borrower and at least one local device, wherein the establishing comprises:
         asking the at least one local device how much bandwidth the at least one local device has available for lending; and
         asking the at least one local device whether the at least one local device can communicate with the actual remote locations or transmit data to the target remote locations; and
      receive data from the actual remote locations or transmit data to the target remote locations via the at least one local device,
   wherein the borrower comprises a first device in communication with a remote network;
   the at least one local device comprises a second device in communication with the remote network and the first device; and
   the second device lends bandwidth to the first device for downloading data from or uploading data to the remote network.

29. The system of claim 28, wherein:
   the first device and the second device communicate with each other using a local wireless communication protocol, and
   the first device and second device each communicates with the remote network using at least one wireless telephony communication protocol.

30. The system of claim 28, wherein the at least one local device further comprises a third device in communication with the remote network and the first device.

31. The system of claim 30, wherein:
   the second device downloads a first portion of data from the remote network and transmits the first portion of data to the first device;
   the third device downloads a second portion of data from the remote network and transmits the second portion of data to the first device.

32. The system of claim 31, wherein:
   the first portion of data and the second portion of data are fragments of a file, and
   the first device reassembles the first portion of data and the second portion of data to create the file.

* * * * *